Feb. 3, 1959 R. A. KRAFT 2,872,513
TELEVISION RECEIVER
Filed Nov. 1, 1954
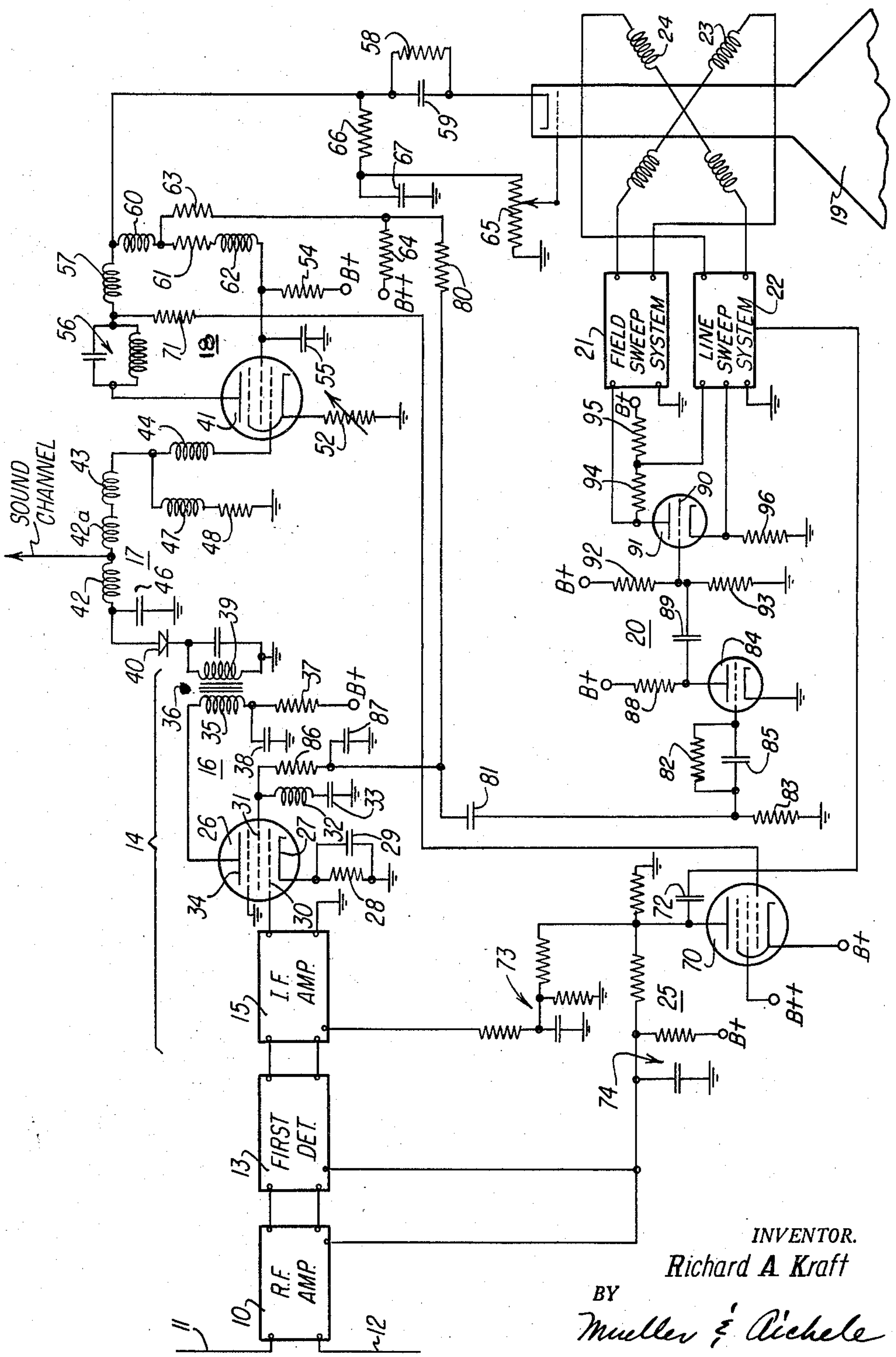
INVENTOR.
Richard A. Kraft
BY
Mueller & Aichele
Attys.

United States Patent Office 2,872,513

Patented Feb. 3, 1959

2,872,513

TELEVISION RECEIVER

Richard A. Kraft, Elmhurst, Ill., assignor to Motorola, Inc., Chicago, Ill., a corporation of Illinois Application November 1, 1954, Serial No. 465,775

7 Claims. (Cl. 178—7.3)

This invention relates generally to television receivers of the type in which the second detector is directly coupled to the image reproducer so as to preserve the direct-current components of the television signal utilized by the receiver, and which receiver is constructed in a new and improved manner so that the synchronizing signal separator stage therein is not subject to paralysis by high level noise disturbances and the like that sometimes accompany the television signal.

The present day monochrome television signal is standardized to include video frequency components occurring in a succession of line and field trace intervals interposed with line and field synchronizing components occurring during line and field retrace intervals, the synchronizing components being pedestalled on associated blanking components so as to extend into the blacker-than-black region beyond the maximum amplitude of the video frequency components. Present day television receivers, accordingly, are provided with a synchronizing signal separator which comprises an electron discharge device biased to clip the high amplitude synchronizing components from the television signal and translate only those components to the line and field sweep systems of the receiver for synchronizing purposes.

It is also usual practice to construct the input circuit of the synchronizing signal separator in such a manner that it responds to the peaks of the synchronizing components to render the separator discharge device therein self-biasing, at least to some extent, so that it will clip the synchronizing components at a fixed level within the television signal despite slight variations in the intensity of the various television signals utilized by the receiver. Such a synchronizing signal separator requires a time constant circuit including a series coupling capacitor, and difficulties having been encountered in the past in overcoming the adverse effects on the synchronizing process of the receiver of high amplitude noise bursts that are sometimes received concurrently with the television signal. The synchronizing components are applied to the self-biasing input circuit of the synchronizing signal separator with positive polarity so that self-biasing due to grid leak action may be achieved. The noise bursts also have positive polarity and any noise bursts having material energy content cause excessive grid current to flow and charge the coupling capacitor in the input circuit. Subsequent discharge of this capacitor biases the synchronizing signal separator discharge device to a non-conductive state and paralyzes the separator for a time interval determined by the time constant of the input circuit of this device. This causes synchronization to be lost until the capacitor regains its normal charge condition because no synchronizing components are translated to the sweep systems of the receiver during the paralyzed interval. Since the input circuit of the separator discharge device must have a certain minimum time constant in order that the proper self-biasing action may be maintained in response to the peaks of the synchronizing components, it is infeasible to reduce the time constant of the input circuit to a sufficiently low value to overcome the deleterious effects of the noise bursts referred to above.

Copending application, Serial No. 386,891, filed October 19, 1953, in the names of Albert W. Massman and the present inventor and assigned to the present assignee, discloses and claims a television receiver in which the effect of the noise bursts discussed above is obviated for all practical purposes. In accordance with the teachings of that application, the screen electrode of an intermediate frequency amplifier discharge device or other stage in the television receiver is connected to the coupling circuit extending to the synchronizing signal separator of the receiver. Due to the non-linear characteristics of the intermediate frequency amplifier at amplitudes corresponding to the noise bursts, the noise bursts are effectively detected in the intermediate frequency amplifier and appear with negative-going polarity in the screen electrode. These noise bursts are used to cancel the positive-going noise bursts in the composite video signal supplied to the separator so as to eliminate the paralyzing effect of such bursts on the separator circuit.

The above described compensating circuit of the copending application includes a direct-current connection from the screen electrode of the intermediate frequency amplifier to the output circuit of the video amplifier of the receiver through which the screen electrode derives its direct-current exciting potential. It is evident that the derived exciting potential must be sufficient to enable the intermediate frequency amplifier discharge device to operate properly. In the receiver disclosed in the copending application using alternating-current coupling between the second detector and the image reproducer, there was no problem in obtaining sufficient direct-current exciting potential from the output circuit of the video amplifier to supply the requirements of the screen electrode of the intermediate frequency amplifier discharge device. However, in a television receiver utilizing direct-current coupling between the video amplifier and the image reproducing or picture tube, and between this amplifier and the automatic gain control (AGC) tube such as disclosed in copending application Serial No. 469,475, filed November 17, 1954, in the name of Fyler, et al. and assigned to the present assignee. The output circuit of the video amplifier is directly coupled to the respective input electrodes of the picture tube and AGC tube. Since it is desirable that the filaments of these tubes be operated at ground potential, the D. C. potential at which the input electrodes may be operated is also limited in present day units to a potential not exceeding 185 volts. In the direct-current coupled receiver, this limitation in turn limits the direct-current exciting potentials that can be used in the video amplifier output circuit. It has been found that this limitation on the D. C. exciting potential in the video output circuit is such that it is insufficient for the screen electrode of the intermediate frequency amplifier when the previously described compensating network of copending application 386,891 is used.

The above described conditions created the problem of providing a system which is capable of limiting the direct-current potential supplied to the picture tube and to the AGC tube to a value below the permissable maximum, and yet provide sufficient exciting voltage for the screen electrode of the intermediate frequency amplifier tube to allow the aforedescribed noise burst compensating circuit to be used. It is, accordingly, an object of the present invention to provide an improved television receiver that is constructed in such a manner that this problem is completely and adequately solved.

A more general object of the invention is to provide an improved television receiver which incorporates direct-current coupling between the second detector and the image reproducing device, and which includes a self-biased amplitude clipper synchronizing signal separator stage, the receiver being constructed in a new and improved manner so that the adverse effect of noise disturbances on the clipping level of the separator is materially reduced.

A feature of the invention is the provision of a video amplifier output circuit that is connected to two different positive unidirectional potential sources of unequal value in such a manner as to permit D. C. coupling of the amplifier to succeeding stages without imparting excessive voltages to the input electrodes thereof, and which permits D. C. coupling to a preceding stage for noise cancellation in the composite video signal impressed on the synchronizing separator of the receiver with sufficient D. C. exciting voltage being applied to the preceding stage for proper operation thereof.

The above and other features of the invention which are believed to be new are set forth with particularity in the appended claims. The invention itself, however, together with further objects and advantages thereof, may best be understood by reference to the following description when taken in conjunction with the accompanying drawing in which the single figure shows a television receiver constructed in accordance with the invention.

The receiver of the present invention is constructed to utilize a television signal which includes video frequency components, synchronizing components and which may include noise components having an amplitude exceeding that of the video and synchronizing components. The receiver includes an intermediate frequency amplifier having a discharge device with an electrode at which only the noise components appear and with negative going polarity. A detector is coupled to the intermediate frequency amplifier for demodulating the television signal to produce a composite video signal and a video amplifier is coupled to the detector. The video amplifier includes a discharge device having an output electrode at which the composite video signal appears with the synchronizing and noise component having positive going polarity. First direct-current impedance means are provided for connecting the output electrode of the video amplifier to a first source of positive unidirectional potential of a selected value, and a second direct-current impedance means is provided for connecting the output electrode to a second source of positive unidirectional potential of a higher value than the first source. Apparatus is provided for separating the synchronizing components from the composite video signal, and a coupling network extends from a point on the second direct-current impedance means to the separating apparatus for supplying the composite video signal to the separating apparatus. Finally, a direct-current connection including a portion of the coupling network extends from the previously mentioned electrode of the intermediate frequency amplifier to the above-mentioned point on the second direct-current impedance means.

The television receiver is illustrated in the accompanying drawing and includes a radio frequency amplifier 10 having input terminals connected to a suitable antenna 11, 12 and having output terminals coupled through a first detector 13 to an intermediate frequency amplifier 14. The intermediate frequency amplifier may have any number of stages connected and coupled together in well known manner and indicated schematically by the block 15, the amplifier also includes a final stage which is shown in circuit form and which is designated generally as 16.

Intermediate frequency amplifier 14 is coupled through a second detector indicated generally as 17 to a video amplifier 18, and the video amplifier is coupled to the input electrodes of an image reproducing device 19 of the cathode ray type. Video amplifier 18 is also coupled to a synchronizing signal separator 20; the separator being connected to a field sweep system 21 and to a line sweep system 22. The output terminals of sweep systems 21 and 22 are connected respectively to the field deflection elements 23 and to the line deflection elements 24 of reproducing device 19. The receiver also includes an automatic gain control circuit 25 which responds to the composite video signal in the output circuit of video amplifier 18 to control the units 10, 13 and 15 of the receiver.

Radio frequency amplifier 10 may be tuned to amplify a television signal intercepted by antenna 11, 12, and the amplified signal is heterodyned in first detector 13 to the selected intermediate frequency of the receiver. The resulting intermediate frequency signal is amplified in intermediate frequency amplifier 14 and detected in second detector 17 to produce a composite video signal. The composite video signal being amplified in video amplifier 18 and applied to the input electrode of reproducing device 19 to control the intensity of the cathode-ray beam therein in accordance with the image intelligence of the received television signal. The synchronizing components of the television signal are separated from the composite video signal in separator 20 and applied to sweep systems 21, 22 to synchronize the operation of the systems and, therefore, the deflection of the cathode-ray beam in device 19. In this manner, reproducing device 19 is enabled to synthesize an image corresponding to the televised scene.

The final stage of intermediate frequency amplifier 14 comprises an electron discharge device 26 having a cathode 27 connected to a point of reference potential or ground through a cathode resistor 28 shunted by a capacitor 29. Device 26 also has a control electrode 30 which is coupled to the preceding intermediate frequency amplifier stage in well known manner. The screen electrode 31 of device 26 is bypassed to a point of reference potential or ground through a series resonant network including an inductance coil 32 and a capacitor 33. The suppressor electrode of device 26 is connected to ground, and the anode 34 of the device is connected through the primary winding 35 of a coupling transformer 36 and through a resistor 37 to the positive terminal B+ of a source of unidirectional potential. The junction of winding 35 and resistor 37 is bypassed to ground through a capacitor 38.

The secondary winding 39 of transformer 36 has one side connected to ground and its other side is connected to one electrode of a rectifying element 40 such as a diode or crystal. The circuit of element 40 constitutes the second detector 17 of the receiver, and the other electrode of the element is directly coupled to the control electrode of an electron discharge device 41 through a direct-current path comprising a series of peaking coils 42, 42*a*, 43, 44. Winding 39 is tuned to the intermediate freqency by a capacitor connected thereacross and diode 40 is bypassed to ground through a capacitor 46. The junction of peaking coils 42 and 42*a* is connected to the sound channel of the receiver. This channel forms no part of the present invention and for that reason is not shown. The junction of peaking coils 43 and 44 is connected to ground through a shunt peaking coil 47 and series connected load resistor 48.

The circuit of device 41 constitutes the video amplifier 18 of the receiver. The cathode of this device is connected to the suppressor electrode, and the cathode is connected to ground through a variable resistor 52, this resistor constituting a well known contrast control. The screen electrode of device 41 is connected to the positive terminal B+ of a source of unidirectional potential through a resistor 54, and this electrode is bypassed to ground through a capacitor 55. The anode of device 41 is directly connected to the cathode of reproducer 19 through a parallel resonant sound trap network 56, through a series peaking coil 57, and through a resistor 58 shunted by a capacitor 59. The junction of coil 57 and resistor 58 is connected to the junction of resistor 54 and capacitor 55 through a peaking coil 60, a resistor 61 and a peaking coil 62. The common junction of coil 60 and resistor 61 is connected through a pair of resistors 63 and 64 to the positive terminal B++ of a source of positive potential higher than the potential at terminal B+. Therefore, a first D. C. impedance means including resistors 61 and 54 connects the anode of device 41 to a first positive source, and a second D. C. impedance means including resistors 63, 64 connects the anode to a second positive source higher than the first source.

The direct-current connection of video amplifier 18 to the input electrodes of device 19 is similar to that disclosed in copending application Serial No. 469,475, now Patent No. 2,828,357, issued March 25, 1958, referred to previously herein. Briefly, the direct-current connection includes a brightness control resistor 65 which is connected to resistor 58 through a resistor 66. The resistor 65 is connected to ground, and the junction of this resistor and resistor 66 is bypassed to ground through a capacitor 67. The movable tap on resistor 65 is connected to the control electrode of image reproducer 19. As fully described in the copending application, the direct-current coupling network is such that the high frequency components of the composite video signal are bypassed to ground by capacitor 67, but a potential corresponding to the average potential of the anode of device 41 appears across brightness control resistor 65. A percentage of the potential across resistor 65 is impressed on the control electrode of the reproducer by the variable tap on this resistor, so that the black level of the reproducer is made substantially constant in the presence of variations in the average potential of the anode of the video amplifier 41.

The automatic gain control circuit 25 is also described in the copending application Serial No. 469,475 referred to previously herein. As described in that application, the AGC circuit is of the gated and selective amplitude delayed type. The control electrode of the AGC discharge device 70 is directly connected through a resistor 71 to the junction of coils 56 and 57 in the output circuit of the video amplifier. The anode of device 70 receives gating pulses through a capacitor 72 from the line sweep system 22, which pulses correspond to the line retrace intervals so that device 70 is gated on in time coincidence with the line synchronizing pulses of the composite video signal appearing at the anode of video amplifier 41. The composite video signal from that anode is impressed on the control electrode of device 70 through the resistor 71, and the line synchronizing pulse components cause a current flow through device 70 of an amplitude corresponding to the peak amplitude of these components.

The use of gated AGC assures that the amplitude of the line synchronizing pulse components at the anode of the video amplifier device 35 will be held essentially constant regardless of changes in intensity of the composite video signal. A usual filter 73 in the output circuit of the AGC tube causes a negative gain control potential to be supplied to the intermediate frequency amplifier 15, and a usual network 74 in a second output circuit of the AGC tube causes a delayed AGC potential to be supplied to the units 10 and 13 of the receiver. This provides a selective AGC control, with the gain of the intermediate frequency amplifier being controlled in the presence of medium strength signals, and the gain of the intermediate frequency amplifier and the units 10 and 13 all being controlled in the presence of strong signals to prevent overloading.

In order to connect the video amplifier 18 to the synchronizing signal separator 20, the common junction of resistors 63 and 64 is connected through a resistor 80 and capacitor 81 to the common junction of a resistor 82 and resistor 83. Resistor 82 is connected to the control electrode of an amplitude clipper electron discharge device 84 in separator 20 and is shunted by a capacitor 85, whereas resistor 83 is connected to ground. The screen electrode 31 of intermediate frequency amplifier discharge device 26 is connected through a resistor 86 to the junction of resistor 80 and capacitor 81, this junction being bypassed to ground through a capacitor 87.

Clipper discharge device 84 of separator 20 has a cathode connected to ground and an anode connected through a load resistor 88 to the positive terminal B+ of the unidirectional potential source. The anode is coupled through a capacitor 89 to the control electrode 90 of a further sync separating discharge device 91 in separator 20. The control electrode 90 is connected to the junction of a pair of resistors 92, 93 which are connected as a potentiometer between the positive terminal B+ and ground. Device 91 has an anode connected to the positive terminal B+ through a pair of resistors 94, 95 and has a cathode connected to ground through a resistor 96. The anode of device 91 is connected to the field sweep system 21; and the junction of resistors 94, 95 and the cathode of device 91 are connected respectively to the line sweep system 22. Separator device 91 may also be used as a phase splitter for the sync pulses applied to the line sweep system by the illustrated connections and this is particularly useful when systems of the type disclosed in Massman Patent 2,645,717 are used.

Rectifier 40 is connected in the second detector 17 with a selected polarity so that the resulting composite video signal appearing across load resistor 48 and peaking coil 47 is negative and has its video frequency components, synchronizing components and associated undesired noise components extending in a negative going direction. The composite video signal is amplified by device 41 and the signal appears across the output circuit of the device in amplified form and with inverted phase. That is, the amplified composite video signal in the output circuit of device 41 has video and synchronizing components extending in a positive going direction and the noise components also extend in a positive going direction with peak amplitudes exceeding that of the synchronizing components. The input circuit 81, 83 and 82, 85 of the sync separator discharge device 84 is known as the double time constant self-biasing type. This input circuit biases device 84 so that it clips the synchronizing components from the composite video signal in the video amplifier output circuit since only these components have sufficient amplitude to overcome the bias of the device and be translated thereby to device 91. Moreover, the input circuit responds to the positive peaks of the synchronizing component to vary the bias of device 84 for differing intensities of the composite video signal so that separator 20 will also clip at a selected level within the composite video signal even though the intensity of the signal may vary within certain limits.

The positive going noise bursts appearing in the composite video signal in the output circuit of video amplifier discharge device 41 cause grid current to flow in device 84 so that capacitors 81 and 85 become excessively charged, and the subsequent discharge of these capacitors through their time constant resistors 83 and 82 bias device 65 in a negative direction to cut off. The separator, therefore, is paralyzed and no longer translates the synchronizing components to the sweep systems 21 and 22. Synchronization is lost, therefore, until the charges of these capacitors regain their operating value. The expedient of using the disclosed double time constant input circuit is well known, and such input circuit corrects this tendency to some extent by providing a low time constant network and a high time constant network in the input circuit. However, this arrangement has been found to be not completely satisfactory and the separator is still subject to paralysis under certain noise conditions.

Discharge device 26 in the intermediate frequency amplifier posses non-linear characteristics for signal amplitudes corresponding to the undesired noise bursts, that is to signal amplitudes exceeding that of the synchronizing components. This device, therefore, effectively detects the high amplitude noise bursts and such bursts appear on the screen electrode 31 across resonant circuit 32, 33 with negative going polarity. In other words, the series resonant circuit 32, 33 which is tuned to the intermediate frequency signal bypasses this signal to the point of reference potential so that the video and synchronizing components of the received television signal which are not detected in device 26 do not appear across this network. However, due to the detection of the high amplitude noise components, they alone appear across network and with negative going polarity. A second circuit means including the resistor 86 is provided which connects the screen electrode 31 of device 26 to the junction of resistor 80 and capacitor 81, and the second circuit means supplies the negative going detected noise components to the circuit means coupling video amplifier 18 to separator 20.

The detected noise components from the screen of device 26, as previously noted, have negative going polarity so that they cancel at least to some extent the positive going noise component in the first circuit means derived from the video amplifier so as to obviate the adverse effects of such positive going noise components on separator 20.

It is to be noted that the screen electrode 31 of intermediate frequency amplifier discharge device 26 derives its direct-current exciting potential from the output circuit of video amplifier 18. This output circuit, however, is directly connected to the cathode of reproducer 19 so that the direct-current exciting voltage in the output circuit is limited to, for example, 185 volts since it is desired to operate the heater or filament of the reproducer at ground potential and there is a limit to the potential difference that can be maintained between the cathode and the heater in the reproducer. A similar situation arises in AGC device 70, since its control electrode is directly connected to the output circuit of video amplifier 18 and the direct-current potential of the control electrode must have a predetermined relation to that of the cathode, which, in turn, is limited due to the desirability of operating the heater of the device at ground potential.

In the circuit of the present invention, the anode of device 41 in the video amplifier is connected effectively to a point on a potentiometer extending between the positive terminal B+ and the positive terminal B++. The screen electrode 31 of device 26 is connected to a point on the potentiometer that is selected to provide a sufficiently high voltage to the screen electrode, and the direct current connections to the cathode of reproducer 19 and to the control electrode of AGC tube 70 are connected to points on the potentiometer that are selected so that the maximum permissible voltage on these latter electrodes is not exceeded. Therefore, for minimum current through the video amplifier discharge device 41, the D. C. potentials to the reproducer tube 19 and AGC tube 70 are limited to their maximum permissible values by the selected points on the potentiometer to which the input electrodes of these tubes are connected; and for maximum current through the video amplifier, the D. C. potential to the screen 31 of the I. F. amplifier 26 is maintained above a limiting minimum by virtue of its connection to a higher potential point on the potentiometer.

In a constructed embodiment of the invention, the following values were used for the circuit elements, and these values are listed merely by way of example and are not intended to limit the invention in any way:

| | |
|---|---|
| Device **26** | 6CB6. |
| Device **41** | 12BY7. |
| B+ | 250 v. |
| B++ | 150 v. |
| Resistor **54** | 470 ohms. |
| Resistor **61** | 5,000 ohms. |
| Resistor **63** | 3,300 ohms. |
| Resistor **64** | 10,000 ohms. |
| Resistor **80** | 5,600 ohms. |
| Resistor **86** | 1,000 ohms. |
| Capacitor **87** | 22 micromicrofarads. |
| Capacitor **81** | .0047 microfarad. |
| Resistor **83** | 1.5 megohms. |
| Resistor **82** | 270 kiloohms. |
| Capacitor **85** | 220 micromicrofarads. |

The invention provides, therefore, an improved television receiver which incorporates direct current coupling between the second detector and the image reproducer, and which includes an improved noise immune synchronizing signal separating system which is constructed in a new and improved manner to operate in such a receiver.

While a particular embodiment of the invention has been shown and described, modifications may be made and it is intended in the appended claims to cover all such modifications as fall within the true spirit and scope of the invention.

I claim:

1. A superheterodyne receiver for utilizing a television signal which includes video frequency components, synchronizing components and noise components of an amplitude exceeding that of the video and synchronizing components, said receiver including in combination, an intermediate frequency amplifier including a discharge device exhibiting non-linear characteristics for signal amplitudes corresponding to said noise components, said device including an input electrode, an output electrode and at least one further electrode; means for heterodyning a received television signal to a selected intermediate frequency and for impressing the resulting intermediate frequency signal on said input electrode; a detector coupled to the output electrode of said intermediate frequency amplifier discharge device for demodulating the television signal to produce a composite video signal, a video amplifier including a discharge device including an input electrode coupled to said detector and further including an output electrode at which the composite video signal appears with the synchronizing and noise components having positive-going polarity; first resistor means for connecting said output electrode of said video amplifier discharge device to a first source of positive unidirectional potential of a selected value, second resistor means for connecting said output electrode of said video amplifier discharge device to a second source of positive unidirectional potential of higher value than said first source; apparatus for separating the synchronizing components from the composite video signal; a coupling network extending from a point on said second resistor means to said separating apparatus for supplying the composite video signal to said separating apparatus; a direct-current connection including a portion of said coupling network extending from said further electrode of said intermediate frequency amplifier discharge device to said point on said second direct-current impedance means for deriving a unidirectional exciting potential for said further electrode of said intermediate frequency amplifier discharge device and for supplying said noise component with negative-going polarity to said coupling network; and a cathode-ray image reproducer having an input electrode coupled to a point on the network formed by said first and second resistor means of lower potential than said first mentioned point on said second resistor means.

2. A superheterodyne receiver for utilizing a television signal which includes video frequency components, synchronizing components and noise components of an amplitude exceeding that of the synchronizing and video components, said receiver including in combination, an intermediate frequency amplifier including an electron discharge device exhibiting non-linear characteristics for signal amplitudes corresponding to said noise components, said device including a control electrode, a cathode, a screen electrode and an anode; means for connecting said cathode to a point of reference potential; means for heterodyning a received television signal to a selected intermediate frequency and for impressing the resulting intermediate frequency signal on said control electrode; a detector coupled to said anode for demodulating the television signal to produce a composite video signal; a video amplifier including an electron discharge device having a cathode connected to said point of reference potential, a control electrode direct-current connected to said detector and an anode at which the composite video signal appears with the synchronizing and noise components having positive-going polarity; first resistor means connecting said anode of said video amplifier to a first source of positive unidirectional potential of a selected value, second resistor means for connecting said anode of said video amplifier to a second source of positive unidirectional potential of higher value than said first source; apparatus for separating the synchronizing components from the composite video signal, a coupling network extending from a point on said second resistor means to said separating apparatus for supplying the composite video signal to said separating apparatus; a direct current connection including a portion of said coupling network extending from said screen electrode of said intermediate frequency amplifier discharge device to said point on said second resistor means for deriving a unidirectional exciting potential for said screen electrode and for supplying said noise components with negative-going polarity to said coupling network; and a cathode-ray image reproducing tube having an input electrode direct-current connected to the common junction of said first and second resistor means.

3. A superheterodyne receiver for utilizing a television signal which includes video frequency components, synchronizing components and noise components of an amplitude exceeding that of the synchronizing and video components, said receiver including in combination, an intermediate frequency amplifier including an electron discharge device exhibiting non-linear characteristics for signal amplitudes corresponding to said noise components, said device including a control electrode, a cathode, a screen electrode and an anode; means for connecting said cathode to a point of reference potential; means for heterodyning a received television signal to a selected intermediate frequency and for impressing the resulting intermediate frequency signal on said control electrode; a detector coupled to said anode for demodulating the television signal to produce a composite video signal; a video amplifier including an electron discharge device having a control electrode direct-current connected to said detector, an anode at which the composite video signal appears with the synchronizing and noise components having positive going polarity and further having a cathode connected to said point of reference potential; a potentiometer extending between two sources of positive unidirectional potential of unequal values, means for connecting said anode of said video amplifier to a first point on said potentiometer; apparatus for separating the synchronizing components from the composite video signal, a coupling network extending from a second point on said potentiometer of higher positive potential than said first point to said separating apparatus for supplying the composite video signal to said separating apparatus; a direct-current connection including a portion of said coupling network extending from said screen electrode of said intermediate frequency amplifier discharge device to said second point on said potentiometer for deriving a unidirectional exciting potential for said screen electrode and for supplying said noise components with negative-going polarity to said coupling network; and a cathode-ray tube having an input electrode direct-current connected to a point on said potentiometer of lower positive potential than said second point.

4. In a television receiver including an intermediate frequency amplifier having a discharge device exhibiting non-linear characteristics for signal amplitudes in excess of a certain amplitude threshold; said device including an input electrode, an output electrode and a further electrode; a detector coupled to said output electrode; a video amplifier having a discharge device including an input electrode coupled to said detector and further including an output electrode, a synchronizing signal separator, and an image reproducing device having an input electrode, the combination of a potentiometer extending between two sources of unidirectional positive potential of unequal values, resistor means for connecting said video amplifier output electrode to a first point on said potentiometer, a coupling network for coupling said separator to a second point on said potentiometer of higher positive potential than said first point and including a direct current connection extending from said second point to said further electrode of said intermediate frequency amplifier discharge device for deriving a unidirectional exciting potential for said further electrode and for supplying signals in excess of said certain amplitude threshold to said coupling network, and a direct-current coupling network connecting said input electrode of said reproducing device to a point on said potentiometer of lower positive potential than said second point.

5. In a television receiver including an intermediate frequency amplifier having an electron discharge device exhibiting non-linear characteristics for signal amplitudes in excess of a certain amplitude threshold; said device including a cathode, a control electrode, a screen electrode and an anode; means for connecting said cathode to a point of reference potential; a detector coupled to said anode; a video amplifier having an electron discharge device including a control electrode direct-current connected to said detector, a cathode connected to said point of reference potential, and an anode; an automatic gain control tube having an input electrode; a synchronizing signal separator; and an image reproducing device having an input electrode, the combination of a potentiometer extending between two sources of positive unidirectional potential of unequal values, resistor means for connecting said anode of said video amplifier discharge device to a first point on said potentiometer, a coupling network for coupling said separator to a second point on said potentiometer of higher potential than said first point and including a direct-current connection extending from said second point to said screen electrode of said intermediate frequency amplifier discharge device to derive a unidirectional exciting potential for said screen electrode and for supplying signals in excess of said certain amplitude threshold to said coupling network, a direct-current coupling network connecting said input electrode of said automatic gain control tube to a point on said potentiometer of lower positive potential than said second point, and a direct-current coupling network connecting said input electrode of said reproducing device to a point on said potentiometer of lower positive potential than said second point.

6. In a television receiver including a video amplifier stage having a first amplifier tube with cathode and anode electrodes, a synchronizing signal separator stage, and an automatic gain control amplifier stage with a second amplifier tube having cathode and control grid electrodes, the combination of a first source of positive direct current potential and a second source of higher positive direct current potential, a voltage divider connected between said sources, means direct current coupling said cathode electrode of said first amplifier tube to a reference point and said anode electrode thereof to a first point of said voltage divider, circuit means coupling said synchronizing signal separator to a second point of said voltage divider for applying signals thereto from said video amplifier stage, means for detecting noise signals accompanying a television signal and for cancelling the same in said circuit means, means direct current coupling said cathode of said second amplifier tube to said first source of potential, and means direct current coupling said control grid of said second amplifier tube to a point of said voltage divider at a potential substantially equal to that of said anode of said first amplifier tube.

7. In a television receiver for utilizing television signals which may be accompanied by noise signals and which receiver includes an intermediate frequency amplifier stage, a detector stage, a video amplifier stage direct-current coupled to said detector stage and having a video amplifier tube with cathode and anode electrodes, and a synchronizing signal separator stage, the combination of a first source of positive direct current potential and a second source of higher positive direct current potential, a voltage divider connected between said sources, means direct current coupling said cathode electrode of said video amplifier tube to a reference point and said anode electrode thereof to a first point of said voltage divider, said intermediate frequency amplifier stage including a tube having a screen grid and circuit means coupled thereto for detecting noise signals accompanying a television signal, means direct current coupling said screen grid to a second point of said voltage divider of higher potential than that of said first point, circuit means for applying signals including noise signals from said video amplifier stage to said synchronizing signal separator stage, and circuit means for applying detected noise signals from said intermediate frequency amplifier stage to said synchronizing signal separator stage with a polarity to cause cancellation of noise signals applied thereto from said video amplifier stage.

References Cited in the file of this patent

UNITED STATES PATENTS 2,717,920 Avins ---------------- Sept. 13, 1955

OTHER REFERENCES

Rider's Television Manual, vol. 12, copyrighted November 18, 1953; Admiral TV, pages 12–39, Motorola TV, pages 12–26.